(12) United States Patent
Singwi et al.

(10) Patent No.: US 11,962,635 B2
(45) Date of Patent: *Apr. 16, 2024

(54) DYNAMICALLY SWITCHING BETWEEN SYNCHRONOUS AND ASYNCHRONOUS COMMUNICATION CHANNELS

(71) Applicant: VMware, Inc., Palo Alto, CA (US)

(72) Inventors: Raunak Ravindra Singwi, Pune (IN); Akeem Lamar Jenkins, Broomfield, CO (US); Marc Wayne Brotherson, Boulder, CO (US); Shivali Sharma, Pune (IN); Sean James Huntley, Sydney (AU)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,746

(22) Filed: Nov. 28, 2022

(65) Prior Publication Data
US 2023/0216939 A1    Jul. 6, 2023

Related U.S. Application Data

(63) Continuation of application No. 17/676,860, filed on Feb. 22, 2022, now Pat. No. 11,516,276.

(30) Foreign Application Priority Data

Jan. 4, 2022  (IN) .............................. 202241000363

(51) Int. Cl.
*H04L 12/26* (2006.01)
*H04L 1/08* (2006.01)
(Continued)

(52) U.S. Cl.
CPC ............... *H04L 67/01* (2022.05); *H04L 1/08* (2013.01); *H04L 43/08* (2013.01);
(Continued)

(58) Field of Classification Search
CPC ......... H04L 69/164; H04L 67/01; H04L 1/08; H04L 43/08; H04L 43/10; H04L 67/141; H04L 67/145; H04L 67/146
(Continued)

(56) References Cited

U.S. PATENT DOCUMENTS

| 7,440,416 | B2 * | 10/2008 | Mahany | .................. | H04L 61/00 |
| | | | | | 370/428 |
| 8,345,588 | B2 * | 1/2013 | Adachi | .................. | H04W 48/18 |
| | | | | | 455/552.1 |

(Continued)

*Primary Examiner* — Jude Jean Gilles
(74) *Attorney, Agent, or Firm* — King Intellectual Asset Management

(57) ABSTRACT

Disclosed herein are systems and methods for dynamically switching between synchronous and asynchronous communication channels. A communication request can be received from an application, and a request identifier can be generated for the communication request. The communication request can be transmitted to an edge server application via a first communication channel. The first communication channel can be selected from a plurality of communication channels based at least in part on a policy. In an instance in which a condition specified by the policy is detected in the transmission of the communication request, a second communication channel can be selected from the plurality of communication channels. The communication request can be transmitted to the edge server application using the second communication channel.

20 Claims, 8 Drawing Sheets

(51) Int. Cl.
*H04L 43/08* (2022.01)
*H04L 43/0823* (2022.01)
*H04L 43/0864* (2022.01)
*H04L 43/0894* (2022.01)
*H04L 43/10* (2022.01)
*H04L 67/01* (2022.01)
*H04L 67/141* (2022.01)
*H04L 67/145* (2022.01)
*H04L 67/146* (2022.01)
*H04L 69/164* (2022.01)

(52) U.S. Cl.
CPC ...... *H04L 43/0823* (2013.01); *H04L 43/0864* (2013.01); *H04L 43/0894* (2013.01); *H04L 43/10* (2013.01); *H04L 67/141* (2013.01); *H04L 67/145* (2013.01); *H04L 67/146* (2013.01); *H04L 69/164* (2013.01)

(58) Field of Classification Search
USPC .......................................................... 709/203
See application file for complete search history.

(56) References Cited

U.S. PATENT DOCUMENTS

| | | | |
|---|---|---|---|
| 8,484,711 B1* | 7/2013 | Coletta | H04L 67/563 726/17 |
| 11,516,276 B1* | 11/2022 | Singwi | H04L 67/146 |
| 2008/0045203 A1* | 2/2008 | Nordin | H04L 12/14 455/422.1 |
| 2013/0267176 A1* | 10/2013 | Hertel | H04L 63/18 455/509 |
| 2019/0098087 A1* | 3/2019 | Johnston | G06F 16/13 |
| 2020/0015140 A1* | 1/2020 | Nam | H04W 36/30 |
| 2021/0250940 A1* | 8/2021 | Raghavan | H01Q 3/28 |

* cited by examiner

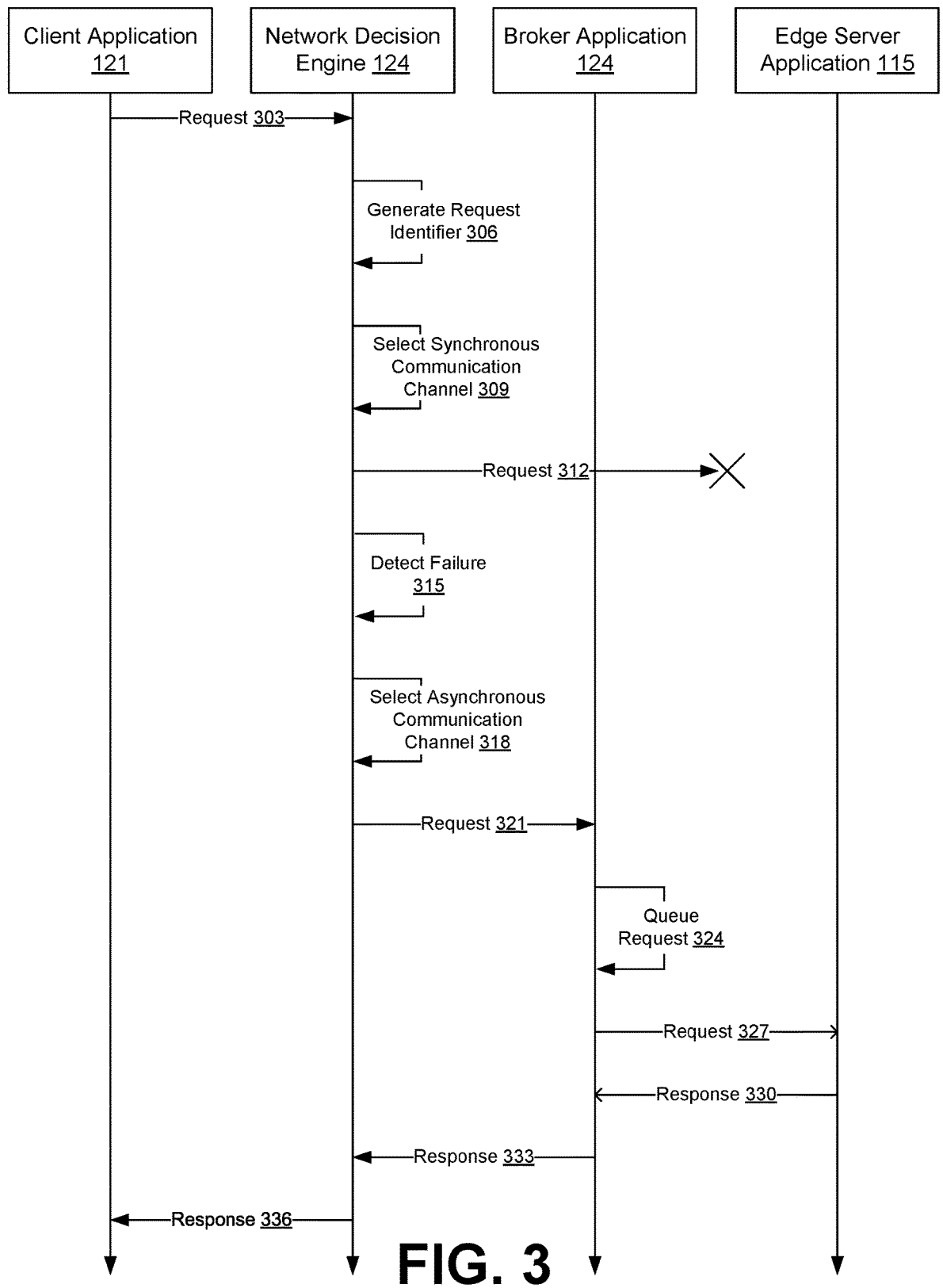

DYNAMICALLY SWITCHING BETWEEN SYNCHRONOUS AND ASYNCHRONOUS COMMUNICATION CHANNELS

CROSS-REFERENCE TO RELATED APPLICATIONS

This application is a continuation of and claims priority to co-pending U.S. application Ser. No. 17/676,860, filed Feb. 22, 2022, and entitled "DYNAMICALLY SWITCHING BETWEEN SYNCHRONOUS AND ASYNCHRONOUS COMMUNICATION CHANNELS," which is incorporated by reference herein in its entirety.

BACKGROUND

Traditional client server architectures make use of either synchronous or asynchronous communications, but not both. When a client has an ephemeral connection to the server, several challenges are faced to keep the continuous communication established. Synchronous communication provides a responsive and fast user experience when good network connectivity is available but produces a very poor user experience when lossy and noisy network connections exist. The introduction of an asynchronous communication path may increase the reliability of communications by guaranteeing that the message is received at some time in the future but can also lead to a poor user experience by introducing latency.

BRIEF DESCRIPTION OF THE DRAWINGS

For a more complete understanding of the embodiments and the advantages thereof, reference is now made to the following description, in conjunction with the accompanying figures briefly described as follows:

FIG. 3 shows a sequence diagram that provides one example of functionality implemented by components of the networked environment, according to various embodiments of the present disclosure.

DETAILED DESCRIPTION

The present disclosure relates to dynamically switching between synchronous and asynchronous communication channels. For client devices that can be physically mobile, being able to seamlessly move between synchronous and asynchronous communication can maximize the user experience irrespective of the client device's connection. Embodiments of the present disclosure can therefore facilitate switching between synchronous and asynchronous communications between a client device and a server for transient network connections.

Figure 1:
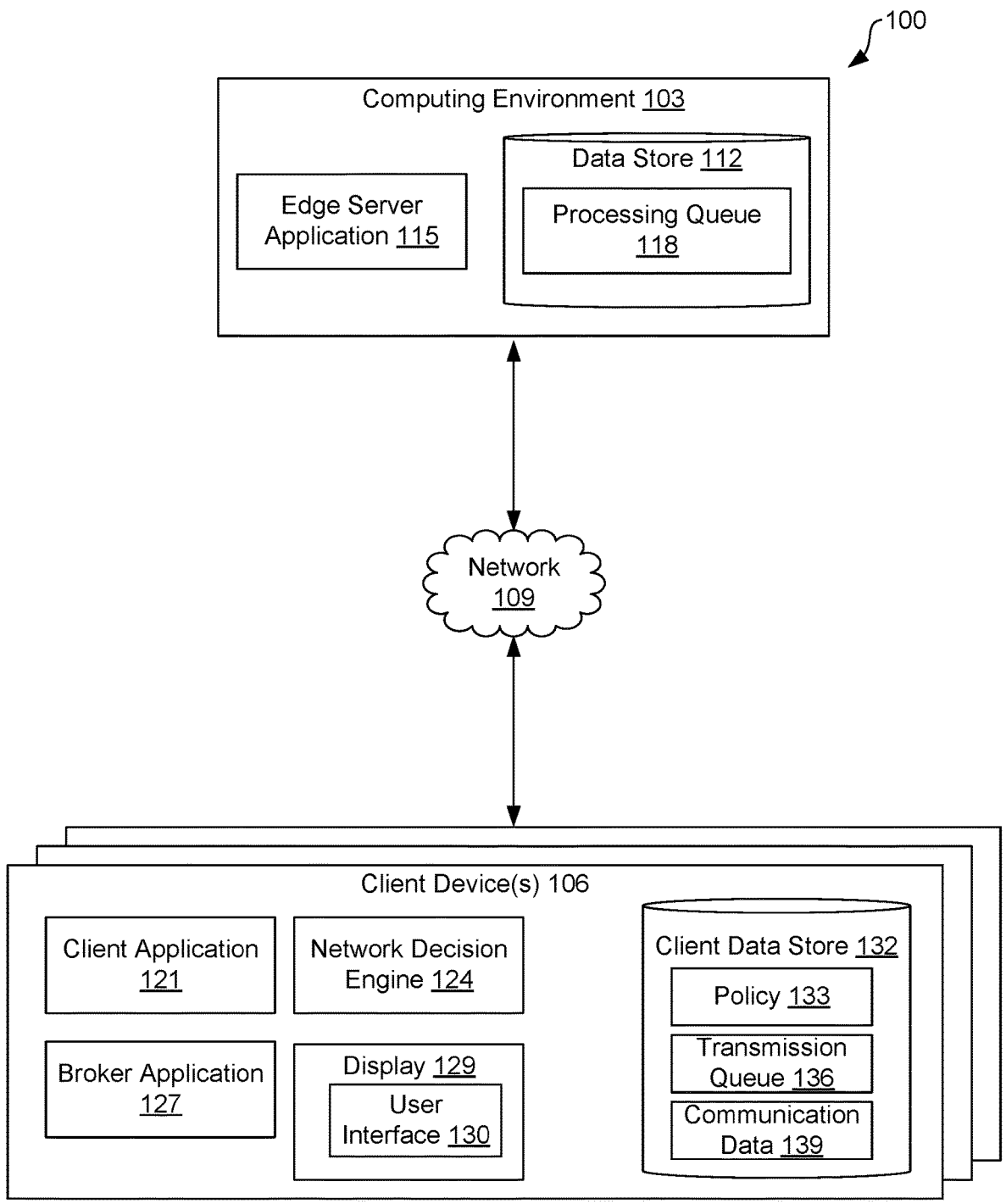
FIG. 1 shows an example of a networked environment, according to various embodiments of the present disclosure.

FIG. 1 shows an example of a networked environment 100. The networked environment can include a computing environment 103 and one or more client devices 106 in communication through a network 109.

The network 109 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 109 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can include a data store 112. The data store 112 can include memory of the computing environment 103, mass storage resources of the computing environment 103, or any other storage resources on which data can be stored by the computing environment 103. The data store 112 can include one or more databases, such as a structured query language (SQL) database, a non-SQL database, or other appropriate database. The data stored in the data store 112, for example, can be associated with the operation of the various applications or functional entities described below. The data stored in the data store 112 can include a processing queue 118 and potentially other data.

The components executed in the computing environment 103 can include, for example, an edge server application 115, as well as other applications, services, processes, systems, engines, or functionality not discussed in detail herein.

The edge server application 115 can be executed to process communication requests received from a client device 106. When a communication request is received from a client device 106, the edge server application 115 can identify a request identifier associated with the communication request. The edge server application 115 can determine how to handle the communication request based at least in part on the request identifier.

When the edge server application 115 receives a communication request, the edge server application 115 can send an acknowledgement of the communication request to the client device 106. The acknowledgement can indicate to the client device 106 that the communication request has been received successfully.

Using request identifiers from communication requests that the edge server application 115 receives during a given communication session with the client device 106, the edge server application 115 can ensure that those communication requests are processed in the proper order. That is, the edge server application 115 can process communication requests sequentially based at least in part on their associated request identifiers. As an illustrative example, if the edge server application 115 receives communication requests with request identifiers of "RID-001" and "RID-002," communication request "RID-001" may be processed before communication request "RID-002," assuming the request identifiers are intended to be processed in an ascending order. A descending order or any other manner of ordering request identifiers may instead be used, however.

In some implementations, the edge server application 115 can prevent duplicate communication requests from being processed so that a single communication request is not processed multiple times. A duplicate communication request may be received if, for instance, a communication request was received via a synchronous communication channel but an acknowledgement of that communication request did not reach the client device. As an example, the edge server application 115 can determine whether a current communication request is a duplicate by comparing the current communication request's request identifier with a greatest request identifier observed during a current communication session between the edge server application 115 and the client device 106. If the communication request is a duplicate, the edge server application 115 can send an acknowledgement of the communication request to the client device 106. The edge server application 115 can then discard the communication request instead of processing the communication request. The edge server application 115 can refrain from processing the communication request to therefore avoid re-processing the communication request, which could lead to unintended results.

In some implementations, the edge server application 115 can prevent communication requests from being processed out-of-order. The edge server application 115 may receive an out-of-order request if, for instance, multiple communication requests are sent via an asynchronous communication channel, or if a communication request is transmitted via a synchronous communication channel immediately following a communication being transmitted via an asynchronous communication channel. As an example, the edge server application 115 can determine whether a current communication request is out or order by comparing the current communication request's request identifier with a greatest request identifier observed during a current session. If the communication request is out of order, the edge server application 115 can place the communication request in the processing queue 118. The communication request can remain in the processing queue 118 until preceding communication requests have been processed.

The edge server application 115 can process communication requests received from the client device 106. When the edge server application 115 processes a communication request, the edge server application 115 can generate a response to the communication request. The response can represent a fulfillment of the communication request. In some implementations, the response may also serve as an acknowledgement of the communication request.

The processing queue 118 can represent an ordered collection of communication requests received by the edge server application 115. In some implementations, a communication request can be placed in the processing queue 118 upon determining that the communication request has been received out-of-order. The communication request can remain in the processing queue 118 until preceding communication requests have been processed. This can allow an intended order for processing of communication requests received during a session to be preserved. Communication requests can be ordered within the processing queue 118 based on an order in which each communication request was placed in the processing queue 118, based on the respective request identifier for each communication request, or based on any other ordering of the communication requests. For example, a communication request can be placed in a position within the processing queue 118 such that the communication request's is in sequence with request identifiers of any other communication requests in the processing queue 118. Thus, the communication request can be placed ahead of any previous communication requests in the processing queue 118 that are intended to be processed after the communication request. Likewise, the communication request can be placed behind any communication requests in the processing queue 118 that are intended to be processed before the communication request.

The client device 106 can be representative of one or more client devices 106 that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 129, such as liquid crystal displays (LCDs), gas plasma-based flat panel displays, organic light emitting diode (OLED) displays, electrophoretic ink ("E-ink") displays, projectors, or other types of display devices. In some instances, the display 129 can be a component of the client device 106 or can be connected to the client device 106 through a wired or wireless connection.

The client device 106 can be configured to execute various applications such as a client application 121, a network decision engine 124, a broker application 127, or other applications. The client application 121 can be executed in a client device 106 to access network content served up by the computing environment 103 or other servers, thereby rendering a user interface 130 on the display 129. To this end, the client application 121 can include a browser, a dedicated application, or other executable, and the user interface 130 can include a network page, an application screen, or other user mechanism for obtaining user input. The client device 106 can be configured to execute applications beyond the client application 121 such as email applications, social networking applications, word processors, spreadsheets, or other applications. The client device can further include a client data store 132. The client data store 132 can store data representing a policy 133, a transmission queue 136, communication data 139, and potentially other data.

The client application 121 can generate communication requests for processing by the edge server application 115. The client application 121 can generate a communication request in response to, for example, user input via the user interface 130. When the client application 121 generates a communication request, the client application 121 can pass that communication request to the network decision engine 124 for transmission to the edge server application 115. The client application 121 can likewise receive responses to communication requests from the network decision engine 124, where those responses were generated by the edge server application 115. In some implementations, the client application 121 can also generate a command to cause the network decision engine 124 to transmit a communication request over a particular communication channel.

The network decision engine 124 can be executed to manage communication of the client application 121 with the edge server application 115 over the network 109 via multiple communication channels. In some implementations, the network decision engine 124 can be implemented as a shim layer that can intercept communication requests generated by the client application 121 for transmission to the edge server application 115. The network decision engine 124 can transmit intercepted communication requests over various communication channels by, for example, interacting with application programming interfaces (APIs) provided for those communication channels. The network decision engine 124 can, in some implementations, include a request identifier for a communication request in a transmission of that communication request to the edge server application 115.

The network decision engine 124 can manage various communication channels between the client device 106 and the edge server application 115. Communication channels managed by the network decision engine 124 can include one or more synchronous communication channels and one or more asynchronous communication channels. The network decision engine 124 can likewise manage communications with the edge server application 115 over the various communication channels.

The network decision engine 124 can monitor performance of the various communication channels between the client device 106 and the edge server application 115. For example, the network decision engine 124 can monitor performance of a synchronous communication channel based on whether and how quickly the network decision engine 124 receives an acknowledgement for a communication request transmitted over the synchronous communication channel. As another example, the network decision engine 124 can monitor performance of an asynchronous communication channel by transmitting "heartbeat" signals over the asynchronous communication channel. That is, the network decision engine 124 can transmit signals at a predefined frequency over the asynchronous communication channel. The network decision engine 124 can then determine the performance of the asynchronous communication channel based at least in part on whether and how quickly the network decision engine 124 receives acknowledgements of those heartbeat signals.

When a communication request is to be transmitted to the edge server application 115, the network decision engine 124 can select a communication channel for transmitting the communication request. In some implementations, the network decision engine 124 can select a communication channel based at least in part on one or more rules or settings specified by the policy 133. For example, the policy 133 can specify that a synchronous communication channel, an asynchronous communication channel, or other particular communication channel should be selected by default— meaning that the particular communication channel should be selected unless a failure or other condition of that communication channel specified by the policy 133 has been detected.

As another example, the policy 133 may specify that the network decision engine 124 can select a communication channel based at least in part on the performance of the respective communication channels. To illustrate, if the network decision engine 124 identifies degradation in the performance of a communication channel used to transmit a previous communication request, the network decision engine 124 may select a different communication channel to transmit a subsequent communication request.

After transmitting a communication request over a synchronous communication channel, the network decision engine 124 can wait a predefined amount of time to receive an acknowledgement. If the network decision engine 124 does not receive an acknowledgement for the request within the predefined amount of time, the network decision engine 124 can retransmit the request.

In some implementations, the network decision engine 124 may retransmit the communication request over a same communication channel that the communication request was initially transmitted. The network decision engine 124 may retransmit the communication request over a same communication channel a predefined number of times without receiving an acknowledgement before selecting a different communication channel over which to transmit the communication request. For example, when a transmission over a synchronous communication channel fails a predefined number of times, the network decision engine 124 can then select an asynchronous communication channel. After retransmitting (or transmitting in the first instance) a communication request over an asynchronous communication channel, the network decision engine 124 may not expect an acknowledgement of the communication request within the predefined period of time for acknowledging synchronous communications due to the asynchronous nature of the transmission. When retransmitting a communication request, the network decision engine 124 may assign to the retransmitted communication request a same request identifier as the initial communication request.

The network decision engine 124 can receive from the edge server application 115 responses to communication requests. The network decision engine 124 can pass such responses to the client application 121. In some implementations, a response to a communication request may also serve as an acknowledgement of that communication request.

The broker application 127 can be executed to manage asynchronous communications between the network decision engine 124 and the edge server application 115. The broker application 127 can receive one or more asynchronous communication requests from the network decision engine 124. The broker application 127 can then transmit such asynchronous communication requests to the edge server application 115 based on an order in which the asynchronous communication requests were received, based on an order specified by the network decision engine 124, or based on any other ordering of the asynchronous communication requests. The broker application 127 can receive acknowledgements of and responses to those asynchronous communication requests from the edge server application 115. The broker application 127 can provide such acknowledgements and responses to the network decision engine 124. In some implementations, however, the functions of the broker application 127 can be performed by the network decision engine 124.

The broker application 127 can, in some implementations, include a request identifier for a communication request in a transmission of that communication request to the edge server application 115. To cause transmission of a communication request, the broker application 127 can, for example, call an API associated with the asynchronous communication channel with the request identifier for the communication request as a parameter.

The user interface 130 can represent a graphical user interface for managing communications between the client device 106 and the edge server application 115. The user interface 130 can be generated by the client application 121 and rendered on the display 129. In some implementations, the user interface 130 can include information regarding the client device's 106 connection with the edge server application 115, information regarding communication requests transmitted by the client device 106, and other information regarding communications between the client device 106 and the edge server application 115. The user interface 130 may in some implementations include one or more selectable components that can cause the client application 121 to generate a communication request, which can then be passed to the network decision engine 124 for transmission to the edge server application 115.

The policy 133 can specify how communication requests and communication channels are managed by the network decision engine 124. The policy 133 can represent one or more settings that govern the network decision engine's 124 behavior in transmitting and receiving communication requests, selecting communication channels, and managing communications between the client device 106 and the edge server application 115. Various settings included in the policy 133 can be configurable by a user of the client device 106 or by an administrator.

The policy 133 can specify one or more rules or settings for selecting a communication channel over which to transmit a communication request. For example, the policy 133 can specify that the network decision engine 124 should initially select a communication request over a same communication channel that was most recently used to transmit a communication request. As another example, the policy 133 can specify that a communication channel should be selected based on a performance of the respective communication channels. The policy 133 can define one or more performance metrics for measuring a performance of a communication channel. These performance metrics can include, for example, communication channels' latency, throughput, bandwidth, jitter, packet loss rate, packet retransmission rate, channel utilization, connectivity, availability, and other metrics. Likewise, the policy 133 can define a threshold for one or more performance metrics that dictate when a communication channel should or should not be selected. As an example, the policy can specify that a communication channel with a lowest latency or with a latency lower than a predefined threshold should be selected.

The policy 133 can specify whether and when a synchronous communication channel or an asynchronous communication channel should be selected when transmitting a communication request. For example, the policy 133 specify that either a synchronous communication channel or an asynchronous communication channel is preferred by default. As another example, the policy 133 can specify that a synchronous communication channel or an asynchronous communication channel should be used exclusively during a particular session or at all times.

The policy 133 can specify one or more conditions under which a communication request should transmitted using a same or different communication channel than was used in a previous transmission. For instance, the policy 133 can specify that a communication request should be retransmitted if the network decision engine 124 detects a failure or other condition in the transmission of a communication request over a particular communication channel. As one example, the policy 133 can specify that a communication request should be retransmitted if an acknowledgement of the communication request is not received within a predefined period of time. Likewise, the policy 133 can specify a number of times a communication request should be retransmitted over a communication channel before a new communication channel should be selected to transmit the communication request. As an additional example, the policy 133 can specify that a communication request should be transmitted over a different communication channel in response to a command received from the client application 121 specifying a particular communication channel.

The transmission queue 136 can represent an ordered collection of asynchronous communication requests. One or more asynchronous communication requests can be placed in the transmission queue 136 for transmission to the edge server application 115 by the network decision engine 124 or by the broker application 127. Asynchronous communication requests can be ordered within the transmission queue 136 based on an order in which each asynchronous communication requests was placed in the queue, based on an order specified by the network decision engine 124, based on the respective request identifiers of the asynchronous communication requests, or based on any other ordering of the asynchronous communication requests. The broker application 127 may transmit asynchronous communication requests in the transmission queue 136 based on the ordering of the asynchronous communication requests in the transmission queue 136.

The communication data 139 can represent information regarding communications between the client device and the edge server application 115. For example, the communication data 139 can include information regarding a current status of the client device's 106 connection with the edge server application 115. As another example, the communication data 139 can include information regarding one or more communication requests that were previously transmitted to the edge server application 115, are currently being transmitted to the edge server application 115, or will be transmitted to the edge server application 115. In some implementations, the client application 121 can access information from the communication data 139 for inclusion in the user interface 130.

FIGS. 2A-2D show examples of user interfaces 130 rendered by the client application 121 in the display 129 of the client device 106. The user interfaces 130 of FIGS. 2A-D can facilitate management of communications between the client device 106 and the edge server application 115. These user interfaces 130 may therefore include information regarding communications between the client device 106 and the edge server application 115.

The user interfaces 130 shown in FIGS. 2A-D include status data 203, request data 206, and a selectable component 209. The status data 203 and the request data 206 can include information from the communication data 139. The status data 203 can include information regarding a current status of the client device's 106 connection with the edge server application 115, including a communication mode, a type of network 109 connection with the edge server application 115, an approximate time of a most recent communication received from the edge server application 115, and other information regarding communications between the client device 106 and the edge server application 115. The request data 206 can include information regarding one or more communication requests that were previously transmitted to the edge server application 115, are currently being transmitted to the edge server application 115, or will be transmitted to the edge server application 115. The information included in the request data 206 can include a name of each such communication request, a status of each communication request, a request identifier for each communication request, and other information regarding each communication request. The selectable component 209 can represent any selectable graphical user interface element that, upon selection, can cause the client application to generate a communication request for processing by the edge server application 115. When the client application 121 generates a communication request a communication request, the selectable component 209 can be visually and/or functionally updated to reflect the to the communication request.

Figure 2A:
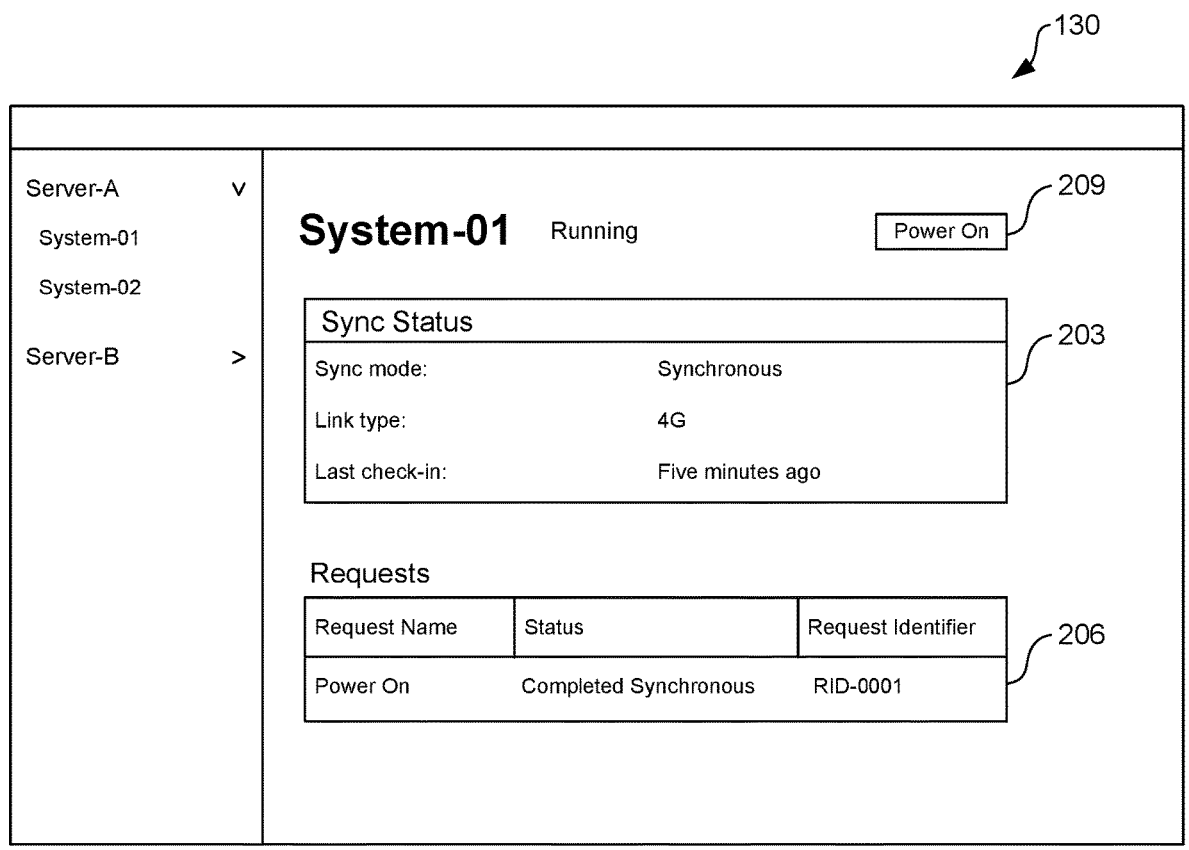
FIGS. 2A-2D show examples of a user interface, according to various embodiments of the present disclosure.

The example of FIG. 2A shows an example of In FIG. 2A, the status data 203 indicates that the client device 106 most recently attempted communication with the edge server application 115 using a synchronous communication channel over a 4G network 109 connection, while a most recent communication from edge server application 115 was received approximately five minutes prior. The request data 206 includes data regarding a communication request with a request identifier of "RID-001" to "Power On" a "System-01" corresponding to the edge server application 115. The request data 206 indicates that the communication request was completed using a synchronous communication channel. The selectable component 209 reflects the completed "Power On" communication request.

Figure 2B:
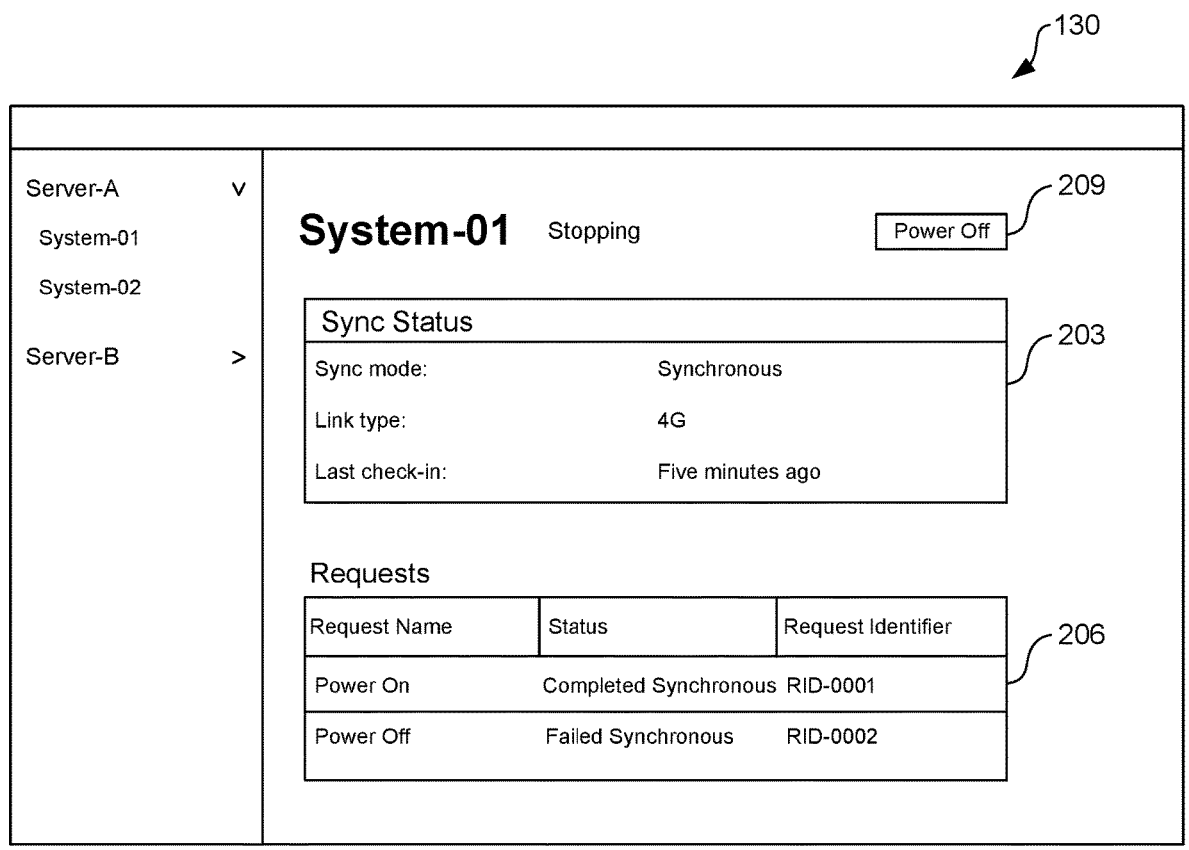

The example of FIG. 2B shows an example of a user interface 130 from the client application 121 after attempting to transmit the communication request to the edge server application 115 via a synchronous communication channel. In FIG. 2B, the status data 203 remains unchanged from FIG. 2A. The request data 206 has been updated from FIG. 2A to include information regarding a communication request with a request identifier of "RID-002." This communication request to "Power Off" the "System-01" corresponding to the edge server application 115 device was submitted after the previous communication request "RID-001." The request data 206 indicates that the network decision engine 124 attempted to transmit the communication request via a synchronous communication channel but detected a failure in the transmission. The "Power Off" communication request may have been generated in response to a selection of the selectable component 209. The selectable component 209 has likewise been updated to reflect generation of the "Power Off" communication request.

Figure 2C:
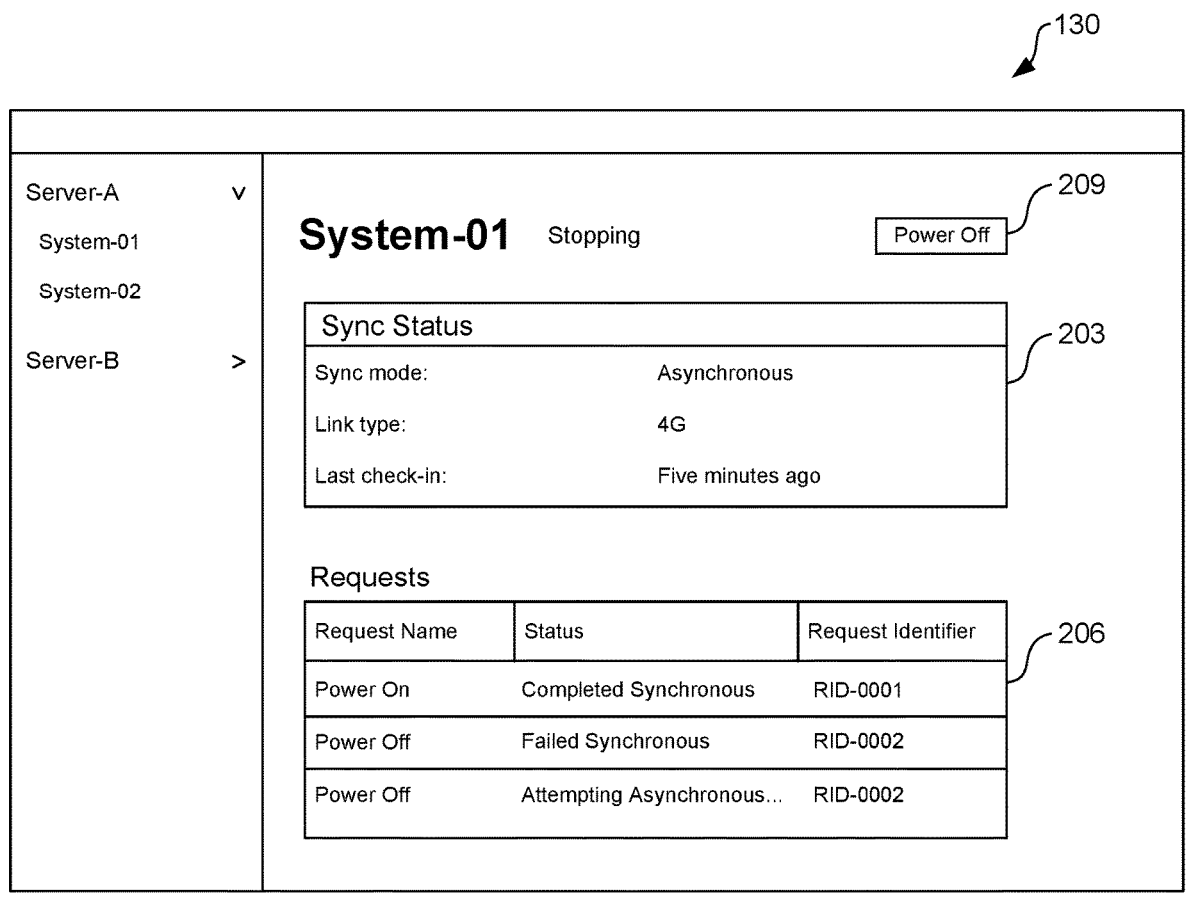

The example of FIG. 2C shows an example of a user interface 130 shows an example of a user interface 130 while attempting to transmit the communication request to the edge server application 115 via an asynchronous communication channel. In FIG. 2C, the status data 203 indicates that the client device 106 has most recently attempted communication with the edge server application 115 using an asynchronous communication channel via a 4G network 109 connection. The status data 203 also continues to indicate that the most recent communication received from the edge server application 115 was received five minutes prior. The request data 206 has been updated from FIG. 2B to include information regarding a communication request that was transmitted over an asynchronous communication channel following the failure in the previous transmission of the communication request over the synchronous communication channel. The network decision engine 124 can determine to retransmit the communication request using the asynchronous communication channel based at least in part on the policy 133. The communication request retransmitted over the asynchronous communication channel therefore includes a same request identifier "RID-002" as the failed communication request over the synchronous communication channel. The request data 206 further indicates that a transmission of the communication request over the asynchronous communication channel is currently being attempted.

Figure 2D:
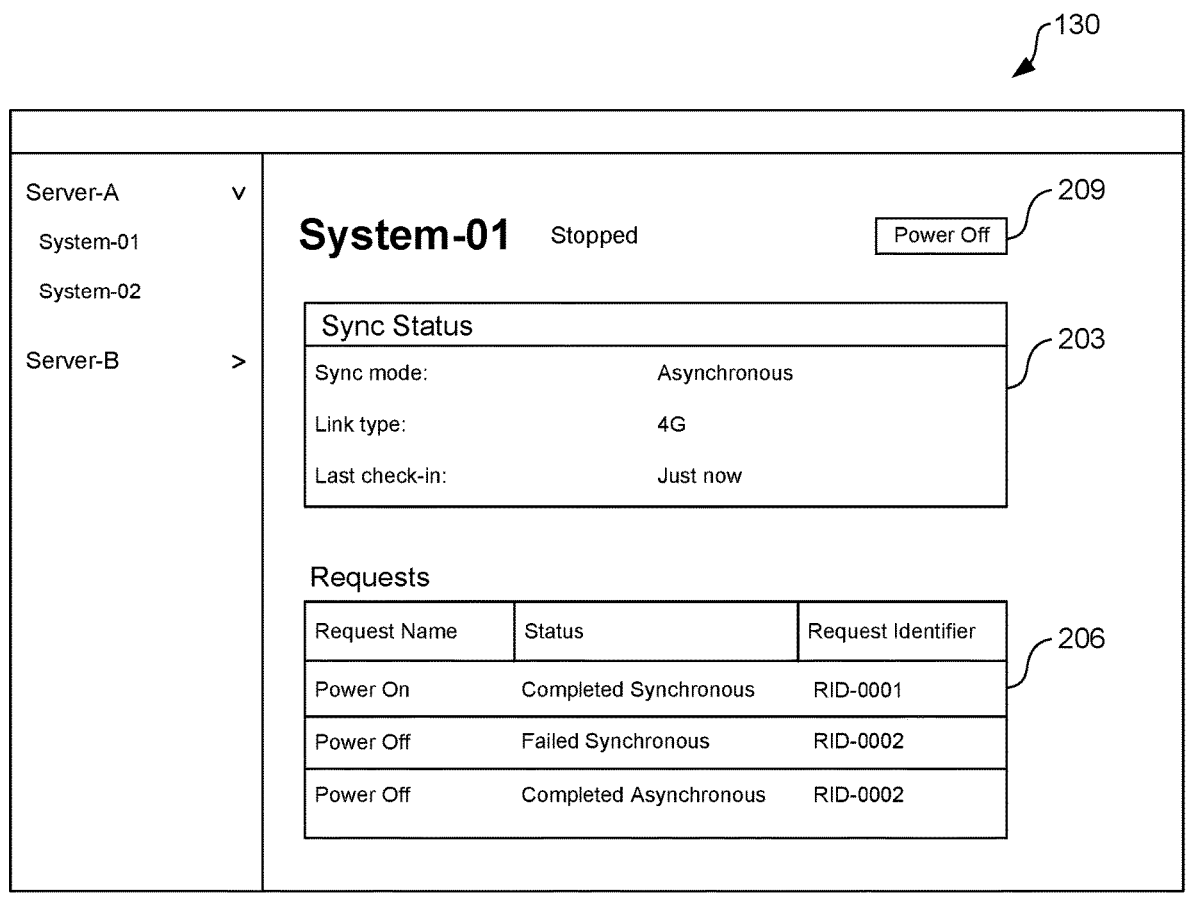

The example of FIG. 2D shows an example of a user interface 130 after successfully transmitting the communication request to the edge server application 115 using the asynchronous communication channel. The status data 203 now indicates that a communication has been received presently from the edge server application 115 using the asynchronous communication channel over the 4G network 109 connection. The request data 206 has been updated to indicate that the communication request "RID-002" that was transmitted using the asynchronous communication channel has been completed. The communication request can be determined to have been completed when, for example, the client application 121 is passed an acknowledgement of the communication request that was sent by the edge server application 115.

FIG. 3 shows a sequence diagram that provides one example of functionality implemented by components of the networked environment 100. It is understood that the sequence diagram of FIG. 3 provides merely an example of the many different types of functional arrangements that can be employed to implement the portions of the networked environment 100 as described herein. As an alternative, the sequence diagram of FIG. 3 can be viewed as depicting an example of elements of a method implemented within the networked environment 100.

At step 303, the client application 121 can provide a communication request to the network decision engine 124. In some implementations, the client application 121 can generate the communication request based at least in part on input received via the user interface 130 in the display.

At step 306, the network decision engine 124 can generate a request identifier for the communication request. The request identifier can uniquely identify the communication request among other communication requests in a given communication session between the client device 106 and the edge server application 115. In some implementations, the request identifier can indicate an order in which the edge server application 115 can process the communication request relative to those other communication requests.

At step 309, the network decision engine 124 can select a synchronous communication channel. The network decision engine 124 can select the synchronous communication channel based at least in part on the policy 133. For example, the policy 133 can specify that the network decision engine 124 should select a synchronous communication channel by default. As another example, the policy 133 can specify that the network decision engine 124 should select a communication channel with a greatest performance or a performance that exceeds a predefined threshold based on one or more performance metrics defined by the policy 133. In that case, the network decision engine 124 can select the synchronous communication channel based on the synchronous communication channel's performance.

At step 312, the network decision engine 124 can attempt to transmit the communication request to the edge server application 115 over the selected synchronous communication channel. The network decision engine 124 can include the request identifier generated at step 306 along with the communication request in the transmission. In some implementations, the network decision engine 124 can call an API associated with the synchronous communication channel with the request identifier for the communication request as a parameter.

At step 315, the network decision engine 124 can detect a failure or other condition in the transmission of the communication request to the edge server application 115. The failure or other condition detected by the network decision engine 124 can be specified by the policy 133. As one example, the network decision engine 124 can determine that an acknowledgement of or response to the communication request has not been received within a predetermined period of time following the transmission. This predetermined period of time may be defined by the policy 133.

At step 318, the network decision engine 124 can select an asynchronous communication channel. The network decision engine 124 can select the asynchronous communication channel in response to the failure in the transmission over the synchronous communication channel. The network decision engine 124 can, for instance, select the asynchronous communication channel following the failure in the synchronous communication channel based at least in part on the policy 133.

At step 321, the network decision engine 124 can provide the communication request to the broker application 127. In some implementations, the network decision engine 124 can include the request identifier with the communication request.

At step 324, the broker application 127 can place the communication request in the transmission queue 136. The transmission queue 136 can include communication requests that have been previously received by the broker application 127 but not yet transmitted to the asynchronous communication request. Asynchronous communication requests can be ordered within the transmission queue 136 based on an order in which each asynchronous communication requests was placed in the queue, based on an order specified by the network decision engine 124, or based on any other ordering of the asynchronous communication requests.

At step 327, the broker application 127 can transmit the communication request and the request identifier to the edge server application 115 over the selected asynchronous communication channel. The broker application 127 may transmit the asynchronous communication request in the transmission queue 136 based on an ordering of the asynchronous communication request within the transmission queue 136. The broker application 127 can include the request identifier generated at step 306 along with the communication request in the transmission. In some implementations, the broker application 127 can call an API associated with the asynchronous communication channel with the request identifier for the communication request as a parameter.

At step 330, the edge server application 115 can provide a response to the communication request to the broker application 127. The edge server application 115 can provide this response after and as a result of processing the communication request. The response can represent a fulfillment of the communication request. In some implementations, the response may also serve as an acknowledgement of the communication request. In implementations where the response does not serve as an acknowledgement of the communication request, the edge server application 115 can transmit a separate acknowledgement of the communication request to the client device 106, either before or after processing the communication request. In some implementations, the edge server application 115 can process the request after determining that the communication request is not a duplicate of a previous communication request received by the edge server application 115 or out of order relative to other communication requests received by the edge server application 115.

At step 333, the broker application 127 can provide the response to the network decision engine 124. At step 336, the network decision engine 124 can provide the response to the client application 121. The process can then proceed to completion.

Figure 4:
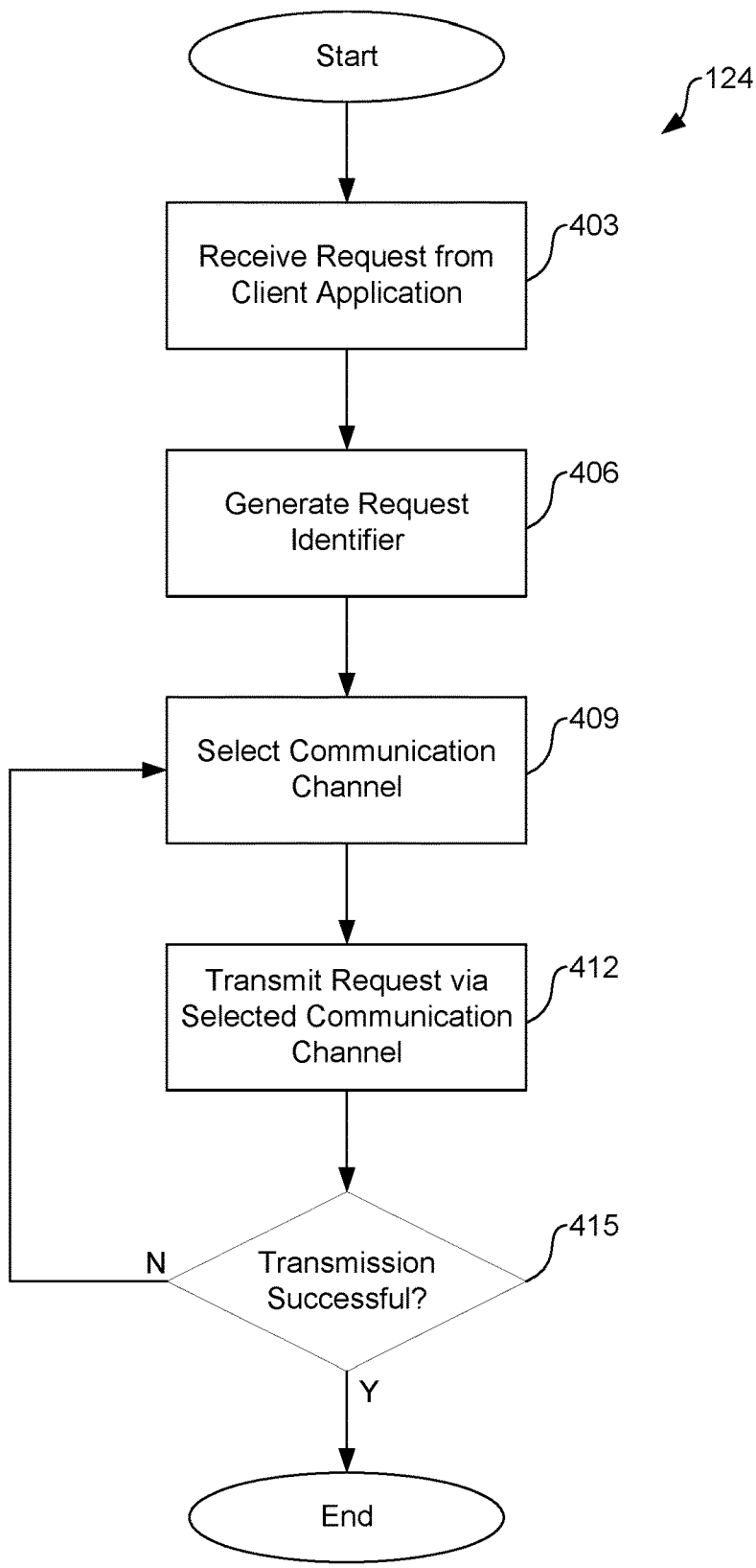
FIG. 4 shows a flowchart that provides one example of functionality implemented by a network decision engine, according to various embodiments of the present disclosure.

FIG. 4 shows a flowchart that provides one example of functionality implemented by the network decision engine 124. The flowchart of FIG. 4 provides merely an example of the many different types of functional arrangements that can be employed to implement the operation of the depicted portion of the network decision engine 124. As an alternative, the flowchart of FIG. 4 can be viewed as depicting an example of elements of a method implemented within the networked environment 100.

At step 403, the network decision engine 124 can receive a communication request from the client application 121. The communication request can be intended for transmission to the edge server application 115. The communication request can have been generated by the client application 121 based at least in part on input received via the user interface 130 in the display.

At step 406, the network decision engine 124 can generate a request identifier for the communication request. The request identifier can uniquely identify the communication request among other communication requests in a given communication session between the client device 106 and the edge server application 115. In some implementations, the request identifier can indicate an order in which the edge server application 115 can process the communication request relative to those other communication requests.

At step 409, the network decision engine 124 can select a communication channel over which to transmit the communication request. The network decision engine 124 can select a communication channel based at least in part on the policy 133. For example, the policy 133 can specify that the network decision engine 124 should select a synchronous communication channel, an asynchronous communication channel, or other particular communication channel by default. The policy 133 can also define one or more conditions upon which this default can be overridden and a different communication channel selected. As another example, the policy 133 can specify that the network decision engine 124 should select a communication channel with a greatest performance or a performance that exceeds a predefined threshold based on one or more performance metrics defined by the policy 133.

At step 412, the network decision engine 124 can transmit the communicated request to the edge server application 115 using the selected communication channel. The network decision engine 124 can include the request identifier generated at step 406 along with the communication request in the transmission. In some implementations, the network decision engine 124 can call an API associated with the selected communication channel with the request identifier for the communication request as a parameter.

At step 415, the network decision engine 124 can determine whether the communication request was successfully transmitted to the edge server application 115. For example, the network decision engine 124 can determine whether an acknowledgement of or response to the communication request has not been received within a predetermined period of time following the transmission. In some implementations, the network decision engine 124 can make this determination based at least in part on one or more conditions specified in the policy 133. If the network decision engine determines that the communication request was not successfully transmitted to the edge server application 115, the process can proceed back to step 409. If the network decision engine determines that the communication request was successfully transmitted to the edge server application 115, the process can proceed to completion.

Figure 5:
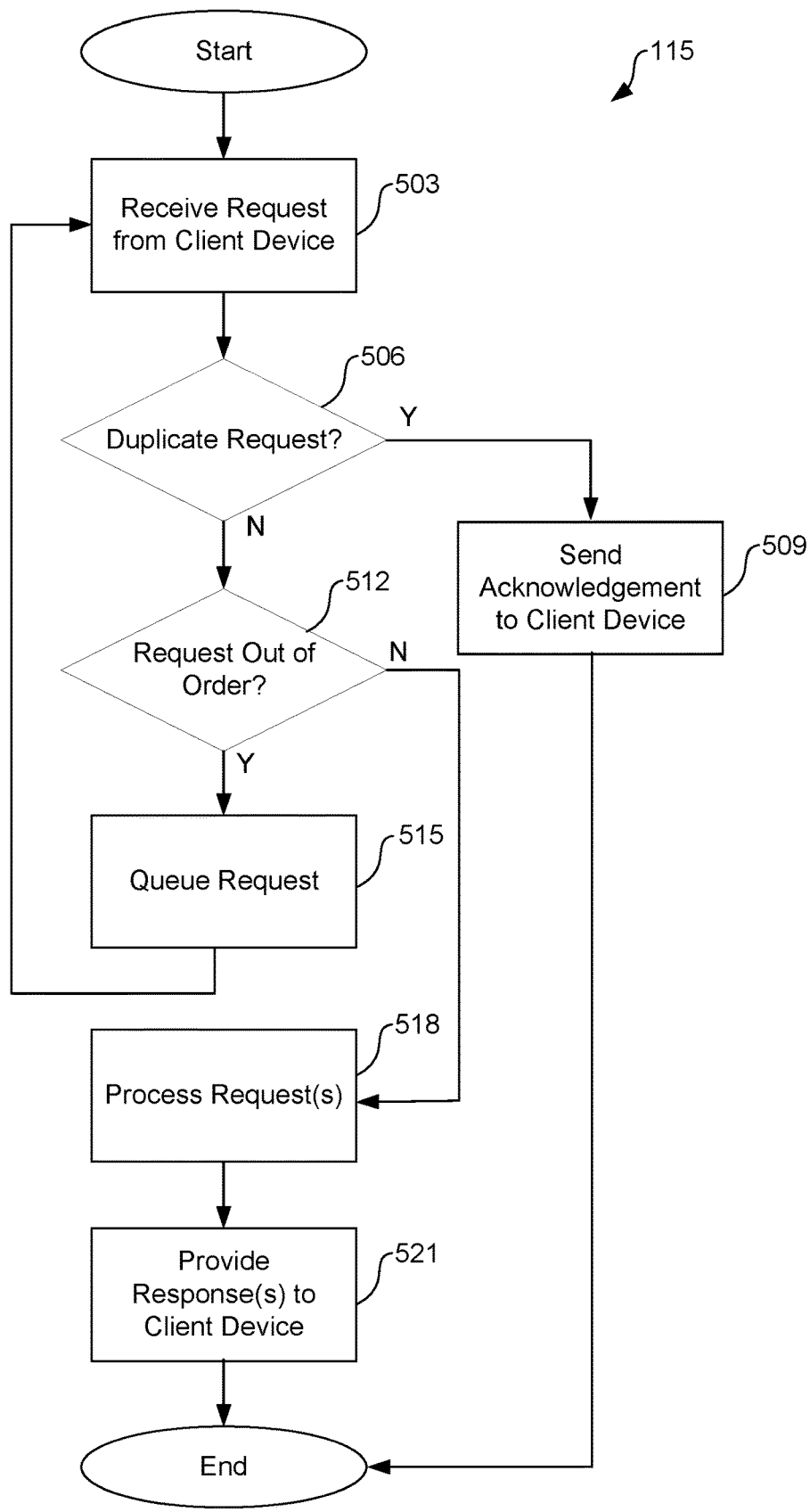
FIG. 5 shows a flowchart that provides one example of functionality implemented by an edge server application, according to various embodiments of the present disclosure.

FIG. 5 shows a flowchart that provides one example of functionality implemented by the edge server application 115. The flowchart of FIG. 5 provides merely an example of the many different types of functional arrangements that can be employed to implement the operation of the depicted portion of the edge server application 115. As an alternative, the flowchart of FIG. 5 can be viewed as depicting an example of elements of a method implemented within the networked environment 100.

At step 503, the edge server application 115 can receive a communication request from the client device 106. The communication request can be received over the network 109. The communication request can have been generated by a client application 121 executing on the client device 106. The communication request can also have been intercepted and transmitted to the edge server application 115 by a network decision engine 124 and/or a broker application 127 executing on the client device 106.

At step 506, the edge server application 115 can determine whether the communication request is a duplicate. For example, the edge server application 115 can determine whether the communication request is a duplicate by comparing the communication request's request identifier with a greatest request identifier observed by the edge server application 115 during a current session. If the edge server application 115 determines that the communication request is a duplicate, the process can proceed to step 509. Otherwise, the process can proceed to step 512.

At step 509, the edge server application 115 can send an acknowledgement of the communication request to the client device 106. The acknowledgement can indicate to the client device 106 that the communication request has been received successfully. The edge server application 115 can send this acknowledgement and refrain from processing the request because the communication request was determined to be a duplicate at step 506. The edge server application 115 can therefore avoid re-processing the communication request, which could lead to unintended results. The process can then proceed to completion.

At step 512, the edge server application 115 can determine whether the communication request is out of order. The edge server application 115 can make this determination based at least in part on a request identifier included with the communication request. For example, the edge server application 115 can determine whether a current communication request is out or order by comparing the current communication request's request identifier with a greatest request identifier observed during a current session. If the edge server application 115 determines that the communication request is out of order, the process can proceed to step 515. Otherwise, the edge server application 115 can proceed to step 518.

At step 515, the edge server application 115 can place the communication request in the processing queue 118. If the communication request is out of order, the communication request can be placed in the processing queue 118 for later processing. The edge server application 115 can place the communication request in a position within the processing queue 118 according to the request identifier included with that communication request. Thus, the communication request can be placed ahead of any previous communication requests in the processing queue 118 that are intended to be processed after the communication request. Likewise, the communication request can be placed behind any communication requests in the processing queue 118 that are intended to be processed before the communication request. The communication request can remain in the processing queue 118 until preceding communication requests have been processed. This can allow an intended order for processing of communication requests received during a session to be preserved. The process can then proceed back to step 503 to receive further communication requests.

At step 518, the edge server application 115 can process the communication request, along with any successive communication requests included in the processing queue 118. If the processing queue 118 includes a previous communication requests that is intended to be processed immediately following the communication request, the edge server application 115 can then process that communication request and any successive communication requests included in the processing queue 118.

At step 521, the edge server application 115 can provide responses to the one or more communication requests processed at step 518. The responses can have been generated in response to the processing of the one or more communication requests. The response can represent a fulfillment of the communication request. In some implementations, the response may also serve as an acknowledgement of the communication request. In implementations where the response does not serve as an acknowledgement of the communication request, the edge server application 115 can transmit a separate acknowledgement of the communication request to the client device 106, either before or after processing the communication request. The process can then proceed to completion.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made Therefore, at least the following is claimed:

1. A system, comprising:
   at least one first computing device comprising a processor and memory; and
   machine-readable instructions stored in the memory that, when executed by the processor, cause the at least one first computing device to at least:
   receive a communication request from an application;
   cause a transmission of the communication request to a second computing device using the first communication channel; and
   in an instance in which a particular condition is detected in the transmission of the communication request, cause a transmission of the communication request to the second computing device using a second communication channel of the plurality of communication channels, the second communication channel and the particular condition being specified by the policy.

2. The system of claim 1, wherein the communication request comprises a request identifier indicating an order in which the communication request is to be processed.

3. The system of claim 1, wherein the machine-readable instructions, when executed by the processor, further cause the at least one first computing device to at least identify the first communication channel among the plurality of communication channels based at least in part on one or more performance metrics for the first communication channel and individual ones of the plurality of communication channels, the one or more performance metrics being specified by the policy.

4. The system of claim 1, wherein the machine-readable instructions, wherein the machine-readable instructions further cause the at least one first computing device to at least detect the condition in the transmission of the communication request, the condition comprising a failure in the transmission of the communication request.

5. The system of claim 1, wherein the machine-readable instructions, wherein the machine-readable instructions further cause the at least one first computing device to at least place the communication request in a transmission queue for transmission using the second communication channel.

6. The system of claim 1, wherein the first communication channel comprises a synchronous communication channel.

7. The system of claim 1, wherein the second communication channel comprises an asynchronous communication channel.

8. A method, comprising:
   receiving a communication request from an application;
   causing a transmission of the communication request to a second computing device using the first communication channel; and
   in an instance in which a particular condition is detected in the transmission of the communication request, causing a transmission of the communication request to the second computing device using a second communication channel of the plurality of communication channels, the second communication channel and the particular condition being specified by the policy.

9. The method of claim 8, wherein the communication request comprises a request identifier indicating an order in which the communication request is to be processed.

10. The method of claim 8, further comprising identifying the first communication channel among the plurality of communication channels based at least in part on one or more performance metrics for the first communication channel and individual ones of the plurality of communication channels, the one or more performance metrics being specified by the policy.

11. The method of claim 8, further comprising detecting the condition in the transmission of the communication request, the condition comprising a failure in the transmission of the communication request.

12. The method of claim 8, further comprising place the communication request in a transmission queue for transmission using the second communication channel.

13. The method of claim 8, wherein the first communication channel comprises a synchronous communication channel.

14. The method of claim 8, wherein the second communication channel comprises an asynchronous communication channel.

15. A non-transitory computer-readable medium embodying program instructions that, when executed, cause at least one computing device to at least:
    receive a communication request from an application;
    cause a transmission of the communication request to a second computing device using the first communication channel; and
    in an instance in which a particular condition is detected in the transmission of the communication request, cause a transmission of the communication request to the second computing device using a second communication channel of the plurality of communication channels, the second communication channel and the particular condition being specified by the policy.

16. The non-transitory computer-readable medium of claim 15, wherein the communication request comprises a request identifier indicating an order in which the communication request is to be processed.

17. The non-transitory computer-readable medium of claim 15, wherein the machine-readable instructions, when executed by the processor, further cause the at least one first computing device to at least identify the first communication channel among the plurality of communication channels based at least in part on one or more performance metrics for the first communication channel and individual ones of the plurality of communication channels, the one or more performance metrics being specified by the policy.

18. The non-transitory computer-readable medium of claim 15, wherein the machine-readable instructions, wherein the machine-readable instructions further cause the at least one first computing device to at least detect the condition in the transmission of the communication request, the condition comprising a failure in the transmission of the communication request.

19. The non-transitory computer-readable medium of claim 15, wherein the machine-readable instructions, wherein the machine-readable instructions further cause the at least one first computing device to at least place the communication request in a transmission queue for transmission using the second communication channel.

20. The non-transitory computer-readable medium of claim 15, wherein the first communication channel comprises a synchronous communication channel and the second communication channel comprises an asynchronous communication channel.

* * * * *